(12) United States Patent
Varma

(10) Patent No.: US 9,378,138 B2
(45) Date of Patent: Jun. 28, 2016

(54) CONSERVATIVE GARBAGE COLLECTION AND ACCESS PROTECTION

(75) Inventor: Pradeep Varma, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 831 days.

(21) Appl. No.: 13/172,039

(22) Filed: Jun. 29, 2011

(65) Prior Publication Data

US 2013/0007073 A1 Jan. 3, 2013

(51) Int. Cl.

| G06F 7/00 | (2006.01) |
|---|---|
| G06F 17/00 | (2006.01) |
| G06F 17/30 | (2006.01) |
| G06F 12/02 | (2006.01) |
| G06F 12/14 | (2006.01) |

(52) U.S. Cl.
CPC ........ *G06F 12/0253* (2013.01); *G06F 12/1416* (2013.01); *G06F 2212/702* (2013.01)

(58) Field of Classification Search
CPC ....................... G06F 12/0253; G06F 2212/702
USPC ................... 707/206, 813; 711/114, 118, 165
See application file for complete search history.

(56) References Cited

U.S. PATENT DOCUMENTS

| 6,125,434 A | 9/2000 | Willard et al. |
|---|---|---|
| 6,128,623 A | 10/2000 | Mattis et al. |
| 6,289,358 B1 | 9/2001 | Mattis et al. |
| 6,823,507 B1 | 11/2004 | Srinivasan et al. |
| 6,874,074 B1 | 3/2005 | Burton et al. |
| 7,308,449 B2 * | 12/2007 | Fairweather |
| 7,389,395 B1 * | 6/2008 | Garthwaite et al. .......... 711/165 |
| 7,472,316 B2 | 12/2008 | Kikuchi et al. |
| 7,761,487 B2 * | 7/2010 | Bansal et al. ................. 707/813 |
| 7,818,799 B2 | 10/2010 | Chen et al. |
| 2004/0139272 A1 | 7/2004 | Rodriguez-Rivera et al. |
| 2004/0172652 A1 | 9/2004 | Fisk et al. |
| 2004/0250239 A1 | 12/2004 | Fox et al. |
| 2005/0015579 A1 | 1/2005 | Grover et al. |
| 2005/0120276 A1 | 6/2005 | Kolawa et al. |
| 2006/0070039 A1 | 3/2006 | Bates et al. |
| 2006/0161516 A1 | 7/2006 | Clarke et al. |
| 2007/0168313 A1 | 7/2007 | Leroy et al. |
| 2007/0234296 A1 | 10/2007 | Zorn et al. |

(Continued)

OTHER PUBLICATIONS

Austin, T. M., et al., "Efficient detection of all pointer and array access errors." In Proc. ACM SIGPLAN 1994 Conf. Programming Language Design and Implementation (Orlando, Florida, United States, Jun. 20-24, 1994). PLDI '94. ACM, New York, NY, 290-301. <DOI=http://doi.acm.org/10.1145/178243.178446>.

Berger, E. D., et al., "DieHard: probabilistic memory safety for unsafe languages," In Proc. ACM SIGPLAN 2006 Conf. Prog. Language Design and Implementation SIGPLAN Not. 41, 6 (Jun. 2006), 158-168, <DOI=http://doi.acm.org/10.1145/1133981.1134000>.

Boehm, H. J., "Space efficient conservative garbage collection," SIGPLAN Not. 39, 4 (Apr. 2004), 490-501, <DOI=10.1145/989393.989442 http://doi.acm.org/10.1145/989393.989442>.

(Continued)

*Primary Examiner* — Susan Chen

(74) *Attorney, Agent, or Firm* — Cuenot, Forsythe & Kim, LLC

(57) ABSTRACT

A method of memory management can include creating an initial root set of pointers for a program during execution of the program and performing a marking process by iteratively marking referred objects of each pointer of the root set and expanding the root set with filtered, encoded pointers. The method also can include identifying each non-live object for any marked object as red-marked and performing, using a processor, a re-marking process on the root set in which red-marked objects are excluded. Each object of the root set not marked can be designated as including a memory leak.

20 Claims, 7 Drawing Sheets

(56) References Cited

U.S. PATENT DOCUMENTS

| | | | |
|---|---|---|---|
| 2008/0140968 A1 | 6/2008 | Doshi et al. | |
| 2009/0030958 A1* | 1/2009 | Garst, Jr. | 707/206 |
| 2009/0271763 A1* | 10/2009 | Varma et al. | 717/114 |
| 2011/0099429 A1 | 4/2011 | Varma et al. | |
| 2011/0252199 A1* | 10/2011 | Serrano et al. | 711/118 |

OTHER PUBLICATIONS

ISO/IEC 9899:1999 C standard, 1999. ISO/IEC 14882:1998 C++ standard, 1998. Also, ISO/IEC 9899: 1999 C Technical Corrigendum, 2001, www.iso.org.

Chilimbi, T. M., et al., "Low-overhead memory leak detection using adaptive statistical profiling," In ASPLOS 2004, SIGPLAN Not. 39, 11 (Nov. 2004), 156-164, <DOI=http://doi.acm.org/10.1145/1037187.1024412>.

Condit, J., et al., "CCured in the real world," In Proc. ACM SIGPLAN 2003 Conf. on Programming Language Design and Implementation (San Diego, California, USA, Jun. 9-11, 2003). PLDI '03. ACM, New York, NY, 232-244, <DOI=http://doi.acm.org/10.1145/781131.781157>.

Dhurjati, D., et al., "Backwards-compatible array bounds checking for C with very low overhead," In Proc. 28th Int. Conf. Software Engineering (Shanghai, China, May 20-28, 2006). ICSE '06. ACM, New York, NY, 162-171, <DOI=http://doi.acm.org/10.1145/1134285.1134309>.

[Dhurjati, D., et al., "Efficiently Detecting All Dangling Pointer Uses in Production Servers," In Proc. Int. Conf. Dependable Systems and Networks (Jun. 2006). DSN '06. IEEE Computer Society, Washington, DC, 269-280.

Dhurjati, D., et al., "SAFECode: enforcing alias analysis for weakly typed languages," In Proc. ACM SIGPLAN 2006 Conf. Prog. Language Design and Implementation, SIGPLAN Not. 41, 6 (Jun. 2006), 144-157, <DOI=http://doi.acm.org/10.1145/1133255.1133999>.

R. Hastings, et al., "Purify: Fast detection of memory leaks and access errors," In Proc. Usenix Winter 1992 Technical Conference (San Francisco, CA, USA, Jan. 1992), Usenix Association, 125-136.

Morrisett, J.T., et al., "Cyclone: A Safe Dialect of C. In Proceedings of the General Track," 2002 USENIX Annual Technical Conference (Jun. 10-15, 2002). C. S. Ellis, Ed. USENIX Association, Berkeley, CA, 275-288.

Jones, R. W. M., et al., "Backwards-compatible bounds checking for arrays and pointers in C programs," In Automated and Algorithmic Debugging, Linkoping, Sweden, pp. 13-26, 1997.

Loginov, A., et al., "Debugging via Run-Time Type Checking," In Proc. 4th International Conf. Fundamental Approaches to Software Engineering (Apr. 2-6, 2001). H. Hullmann, Ed. LNCS vol. 2029. Springer-Verlag, London, 217-232.

Necula, G. C., et al., "CCured: type-safe retrofitting of legacy code," In Proc. 29th ACM SIGPLAN-SIGACT Symposium on Principles of Programming Languages (Portland, Oregon, Jan. 16-18, 2002). POPL '02, ACM, New York, NY, 128-139, <DOI= http://doi.acm.org/10.1145/503272.503286>.

Nethercote, N., et al., "Valgrind: a framework for heavyweight dynamic binary instrumentation," In Proc. ACM SIGPLAN Conf. on Programming Language Design and Implementation (Jun. 2007), PLDI '07, ACM, New York, NY, 89-100. DOI= http://doi.acm.org/10.1145/1273442.1250746>.

Oiwa, Y., "Implementation of a Fail-Safe ANSI C Compiler,". PhD Thesis, Department of Computer Science, University of Tokyo, Dec. 2004.

Qin, F., et al., "SafeMem: Exploiting ECC-Memory for Detecting Memory Leaks and Memory Corruption During Production Runs," In Proc. HPCA (Feb. 12-16, 2005). IEEE Computer Society, Washington, DC, 291-302.

Ruwase, O., et al., "A practical dynamic buffer overflow detector," In Proc. Network and Distributed System Security (NDSS) Symposium. Feb. 2004, 159-169.

Seward, J., et al., "Using Valgrind to detect undefined value errors with bit-precision," In Proc. USENIX Annual Technical Conference (Anaheim, CA, Apr. 2005), USENIX '05. USENIX Association, Berkeley, CA.

Varma, P. "Generalizing Recognition of an Individual Dialect in Program Analysis and Transformation", In Proc. ACM Symp. Applied Computing (SAC 2007) (Seoul, Korea, Mar. 11-15, 2007) ACM Press, New York. 1432-1439, <DOI=http://doi.acm.org/10.1145/1244002.1244310>.

Varma, P., et al., "NextGen EXtreme Porting: Structured by Automation", In Proc. ACM Symp. Applied Computing (SAC 2005) (Santa Fe, NM, USA, Mar. '05) ACM Press, New York. 1511-1517, DOI=http://doi.acm. org/10.1145/1066677.1067018>.

Xu, W., et al., "An efficient and backwards-compatible transformation to ensure memory safety of C programs," In Proc. 12th ACM SIGSOFT Int. Symposium on Foundations of Software Engineering (Newport Beach, CA, USA, Oct. 31-Nov. 6, 2004), SIGSOFT '04/FSE-12. ACM, New York, NY, 117-126, <DOI= http://doi.acm.org/10.1145/1029894.1029913>.

Akritidis, P., et al., "Baggy bounds checking: an efficient and backwards-compatible defense against out-of-bounds errors," In Proceedings of the 18th conference on USENIX security symposium (SSYM'09), USENIX Association, Berkeley, CA, USA, 51-66.

Shetty, R., et al., "HeapMon: a helper-thread approach to programmable, automatic, and low-overhead memory bug detection," IBM Journal of Research and Development, v.50 n.2/3, p. 261-275, Mar. 2006.

Yoshino, T., "A famework using a common language to build program verifiers for low-level languages," Master Thesis, Dept. of Comp. Sco., Faculty of Info. Sci. and Tech., Univ. of Tokyo, Feb. 2006, 74 pgs.

Cho, D.W., et al., "A new approach to detecting memory access errors in C programs," In 6th Annual IEEE/ACIS International Conference on Computer and Information Science (ICIS 2007), Jul. 11-13, 2007, Melbourne, Australia. pp. 885-890, IEEE Computer Society, 2007.

Saraswat, V., "Report on the Experimental Language X10," [online] Version 1.01, Dec. 8, 2006, retrieved from the Internet: <x10.sourceforge.net/documentation/languagespec/x10-101.pdf> 40 pgs.

Allen, E., et al., "The Fortress Language Specification," [online] Tech. Report, Sun Microsystems, Apr. 26, 2005, retrieved from the Internet: <www.cis.udel.edu/~cavazos/cisc879/papers/fortress.pdf> 111 pgs.

"Chapel Specification 0.4," [online] Cray Inc., retrieved from the Internet: <chapel.cray.com/spec/spec-0.4.pdf>, 156 pgs.

Bacon, D.F., et al., "A Real-time Garbage Collector with Low Overhead and Consistent Utilization," Proc. of 30th ACM SIGPLAN-SIGACT Sym. on Principles of Programming Languages, POPL '03, vol. 38, No. 1, Jan. 15-17, 2003, 14 pgs.

Chilimbi, T.M., et al., "Cache-conscious structure definition," Proceedings of the ACM SIGPLAN'99 Conference on Programming Language Design and Implementation, May 1999, 12 Pgs.

Chilimbi, T.M., et al., "Cache-conscious structure layout," Proceedings of the ACM SIGPLAN'99 Conference on Programming Language Design and Implementation, May 1999, 12 Pgs.

Dhurjati, D., et al., "Efficiently Detecting All Dangling Pointer Uses in Production Servers," In Proceedings of the International Conference on Dependable Systems and Networks (2006), pp. 269-280.

El-Ghazawi, T.A., et al., "UPC Language Specifications V1.0," Feb. 25, 2001, 40 pgs.

Spoonhower, D., et al., "Eventrons: a safe programming construct for high frequency hard real time applications," In PLDI '06; Proc. of the 2006 ACM SIGPLAN Conf. on Programming Language Design and Implementation, pp. 283-294, 2006.

Boehm, H.J., et al., "Garbage Collection in the Next C++ Standard," [online] HP Laboratories, ACM ISMM '09, Proc. of 2009 Int'l Sym. on Memory Management, Nov. 6, 2009, [retrieved May 26, 2011] retrieved from the Internet: <http://www.hpl.hp.com/techreports/2009/HPL-2009-360.pdf>.

Varma, P., et al., "Backward-compatible, constant-time, exception-protected memory," [online] ACM SIGSOFT Symposium on Foundations of Software Engineering, Aug. 24-28, 2009, pp. 71-80 [retrieved May 26, 2011] retrieved from the Internet: <http://portal.acm.org/citation.cfm?id=1595710>.

\* cited by examiner

```
// presumed: heap_offset_bits
// presumed void * protected_heap_first
typedef unsigned long word;
#define H (1 << heap_offset_bits)
#define version_bits (sizeof(word) * CHAR_BIT – heap_offset_bits)
#define no_of_versions (1 << version_bits)
word unused_heap_offset = 0;
#define marker_value ... // random
typedef struct
     {word v : version_bits;
       word offset : heap_offset_bits;
     } P;
typedef struct
     {P meta1;  // stores version, next
      P meta2;  // stores marker, previous
      char o[k];
     } L_k;
word allocated_list_k =0;          // initialized empty
word free_list_k = 0;              // initialized empty
word unusable_free_list_k = 0;     // initialized empty
word last_version_k = no_of_versions – 2;
```

FIG. 1

```
// translate version-carrying pointer
void * decode_pointer (void * ptr)
 { return protected_heap_first + ((P *) &ptr)->offset; }
bool verify (void * ptr) {
  return ((P *) &ptr) ->v ==
        (((P *) decode_pointer(ptr)) – 2) ->v;}
```

FIG. 2

```
void * allocate_protected_k () {
P * ptr, meta;
 if (free_list_k != 0)   // allocate from free list
    { ptr->offset = free_list_k;
      meta = ((P *) (protected_heap_first + free_list_k)) – 2;
      ptr->v = meta->v;
      free_list_k = meta-> offset; }
   // allocated from unused heap
 else if (H – unused_heap_offset >=  k + 2 * sizeof(P) ) {
    ptr->offset = unused_heap_offset + 2 * sizeof(P);
    meta = (P *) (unused_heap_offset + protected_heap_first);
    meta->v =  (last_version_k + 2) % no_of_versions;
    (meta + 1)->v = marker_value;
    unused_heap_offset = unused_heap_offset + k + 2 * sizeof(P) ;
    ptr->v = meta->v;}
 else return NULL;  // indicates failure to allocate
 meta->offset = allocated_list_k;
 if (allocated_list_k != 0)           // set previous
     (((P *) (protected_heap_first + allocated_list_k)) -1)->offset
          = ptr->offset;
 allocated_list_k = ptr->offset;   // set head of list
 (meta + 1) -> offset = 0;  // set previous
 return *((void **) ptr);  /* return encoded pointer */ }
```

FIG. 3

```
bool increment_version (P * meta, word last) {
  word gap = (last + (no_of_versions - meta->v)) % no_of_versions;
  meta->v = (meta->v + 1 ) % no_of_versions;
  return (gap != 0);
}
void deallocate_protected_k (void * ptr) {
  P * meta = ((P *) decode_pointer(ptr)) - 2 ;
  word next = meta->offset;
  word previous = (meta + 1) -> offset;
  // modify object version and add to appropriate free list
  if (increment_version(meta, last_version_k))
     { meta->offset = free_list_k;
       free_list_k = ((void *) (meta + 2)) - protected_heap_first;}
  else {meta->offset = unusable_free_list_k;
     unusable_free_list_k = ((void *) (meta + 2)) - protected_heap_first;}
  // remove from allocated list
   if (previous == 0)  allocated_list_k = next;    // reset next
   else (((P *) (protected_heap_first + previous)) - 2)->offset = next;
   if (next != 0)
      (((P *) (protected_heap_first + next)) - 1)->offset = previous; }
```

FIG. 4

CONSERVATIVE GARBAGE COLLECTION AND ACCESS PROTECTION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

One or more embodiments disclosed within this specification relate to memory management. More particularly, one or more embodiments relate to garbage collection and memory access protection.

Memory safety in the context of C/C++ type programs has become a significant concern. Memory access errors can refer to a dereference outside the bounds of the referent, either address-wise or time-wise. Address-wise access errors are spatial access errors with one example being an array out of bounds access error. Time-wise access errors are temporal access errors with one example being dereferencing a pointer after the object has been freed.

Conventional garbage collection techniques typically presume that pointers collected in a scan of a program memory reflect all of the pointers that the program will utilize. Such presumptions, however, do not account for the arbitrary synthesis capabilities that exist within C/C++ type languages. Arbitrary pointer synthesis allows the program to generate further pointers to memory during execution. This capability can negate the analysis results described above.

BRIEF SUMMARY

One or more embodiments disclosed within this specification relate to memory management and, more particularly, to garbage collection and memory access protection.

An embodiment can include a method of memory management. The method can include creating an initial root set of pointers for a program during execution of the program and performing a marking process by iteratively marking referred objects of each pointer of the root set and expanding the root set with filtered, encoded pointers. The method also can include identifying each non-live object for any marked object as red-marked and performing, using a processor, a re-marking process on the root set in which red-marked objects are excluded. Each object of the root set not marked can be designated as including a memory leak.

Another embodiment can include a system having a computer readable storage medium having computer readable program code embodied therewith and a processor. The processor can be coupled to the computer readable storage medium, Responsive to executing the computer readable program code, the processor can be configured to perform executable operations for memory management as described within this specification,.

Another embodiment can include a computer program product for memory management. The computer program product can include a computer readable storage medium having computer readable program code embodied therewith. The computer readable program code can include computer readable program code configured to perform the various functions and processes described within this specification.

BRIEF DESCRIPTION OF THE SEVERAL VIEWS OF THE DRAWINGS

FIG. 1 is a diagram illustrating basic declarations in accordance with an embodiment disclosed within this specification.

FIG. 2 is a diagram illustrating read and write related operations in accordance with another embodiment disclosed within this specification.

FIG. 3 is a diagram illustrating allocation operations in accordance with another embodiment disclosed within this specification.

FIG. 4 is a diagram illustrating deallocation operations in accordance with another embodiment disclosed within this specification.

DETAILED DESCRIPTION

Figure 5:
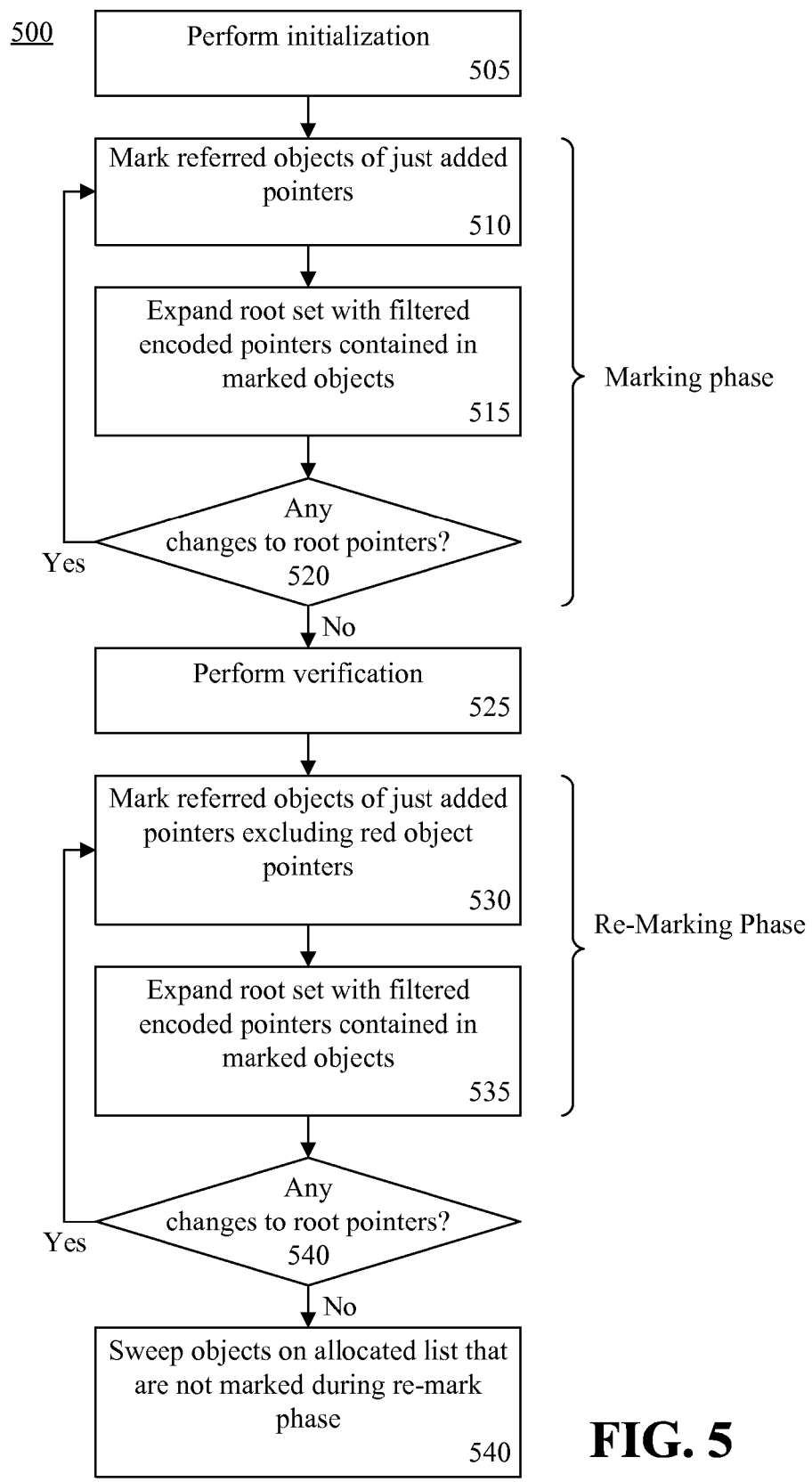
FIG. 5 is a flow chart illustrating a method of conservative garbage collection in accordance with another embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area. network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to memory management and, more particularly, to garbage collection and memory access protection. In accordance with the one or more embodiments, conservative garbage collection techniques are provided that account for arbitrary pointer synthesis capabilities of modern programming languages such as, for example, C/C++ type languages. Pointer arithmetic can be used in the context of memory scanning and further in drawing memory management conclusions. Arbitrary, un-typed pointers in program memory in addition to general pointer synthesis can be handled. Using the garbage collection techniques, techniques for memory leak analysis also are provided.

Garbage collection techniques coupled with memory inspection techniques disclosed within this specification enable the reduction of inspection from the entire machine memory to only live program memory. Metadata and object-based filtering of putative pointers during the garbage collection process are utilized to reduce pointer candidates.

In an embodiment, an object version is stored with the object itself and thus is available in cache with the object for lookup within constant time. An object can be defined in accordance with the C standard's definition as, for example, a storage area having contents that can be interpreted as a value. Further, a version can be an instantiation or lifetime of the storage area. As such, tables are not required or utilized each time an object is accessed and page tables are not directly invoked or utilized.

Using version(s) within the object itself, the overheads associated with temporal access error checking in can asymptotically be guaranteed to be within constant time. Furthermore, since each object has a version field dedicated to that object, the space of capabilities can be partitioned at the granularity of individual objects and is not shared across all objects, thereby providing increased efficiency over other conventional techniques.

Versions, for example, can be represented as a bitfield within the word that effectively contains the base address of the referent (as an offset into a pre-allocated protected heap). Using versions represented in this manner, one, i.e., a single, word can be saved for capabilities rather than utilizing more than one word as is the case with other solutions. Since versions are tied to objects, the object or storage space can be dedicated to use solely by re-allocations of the same size (unless the garbage collector intervenes, as described later within this specification). This fixedness of objects is put to further use by saving the referent's size with the object itself like the version, thereby saving another word from the pointer metadata.

These savings in pointer metadata allow the encoded pointers to be reduced to standard scalar sizes of one or two words in contrast to the 4-plus words size of other conventional memory management techniques. Standard scalar sizes means that the encoded pointers further assist backward compatibility, avail of standard hardware support for atomic reads and writes, can be meaningfully cast to/from other scalars, and can achieve higher optimization via register allocation and manipulation.

The one or more embodiments disclosed herein can detect memory access errors at the level of memory blocks. A memory block can include the least unit of memory allocation such as a global or local variable, or the memory returned by a single invocation of malloc. Fresh memory blocks, e.g., un-accessed memory blocks, can be treated as being of type void *. When a memory block is accessed for pointer types, the appropriate encoding of the random block data can ensure that either a random valid encoded pointer to an object is obtained, or an exception is thrown. Initializing each memory block with zero to guarantee pointer initialization with NULL pointers is a straightforward compiler option, By detecting memory access errors at the level of memory blocks, the general pointer arithmetic model supported by C, with dereferences disallowed only when they cross allocation bounds and not while they remain within, can be supported, For example, a safe memcpy() can be written that takes an element pointer of a struct (e.g., a data structure) and copies up or down without exception so long as the element pointer remains within the allocated memory for the struct. As arithmetic can cause a pointer to cross allocation boundaries arbitrarily, only dereferences have to be within the allocated memory. Further, unbounded heap recycling is supported.

In accordance with the inventive arrangements, conservative garbage collection and memory access protection are utilized together for mutual benefit in the following ways. The one or more embodiments disclosed herein can handle both arbitrary, un-typed pointers in program memory along with general pointer synthesis. Leak analysis is also provided thereby facilitating the safe collection of unreferenced, allocated memory in C/C++ type programs. Memory inspection can be reduced from entire machine memory to just the live program memory. Within conventional systems, such a reduction of memory cannot be implemented since, for example, program execution does not utilize access validity checks in access-protected memory and there is a lack of support for pointer synthesis. As such, program execution has effectively free run over all the potentially-pointed, addressable memory, even if outside currently allocated memory. Access validity checks in access-protected memory. Metadata and object-based filtering of putative pointers during garbage collection can be used to reduce pointer candidates. Furthermore, filter operation for a pointer takes constant time during garbage collection for putative, encoded pointers.

The one or more embodiments disclosed herein provide access protection supporting unbounded memory recycling (i.e. supporting an unbounded space of capabilities/versions). For example, version representation recycling can be implemented that incurs only constant cost per objects queue in tracking recyclable versions. Modulo arithmetic can be used to bound version representations as recycling advances versions through unboundedly large positive integers. Version-re-interpretation is provided that ensures advancement of tong-lived objects through the unbounded versions space to prevent their becoming straggler versions and to enable continual availability of free versions.

In addition, general space re-allocation support is provided that allows space to be used and re-claimed for differently sized objects and not just same-size objects. Further, increased error coverage including the abovementioned memory leak detector and complete coverage of un-initialized pointer dereferences can be provided.

The garbage collection techniques illustrated within this specification provide accurate results as opposed to conjectural results. Within the context of access protected systems, the one or more embodiments disclosed herein guarantee user-non-access to object and fat pointer metadata. Moreover, in accordance with the inventive arrangements, malicious programming can be eliminated thereby enabling safe applet development in the C context, e.g., using C/C++ type languages.

In an embodiment, exception protected memory can reside in a dedicated heap for the purpose of implementing a protected heap. A stack and global space can reside outside of the protected heap. The protected heap must be configured with a contiguous space reserved for that purpose. The contiguous space can be reserved for the protected heap at the beginning of a program run. The stack and global address space do not require a contiguous space.

For example, N can represent the number of bits used to represent pointers to the address space. In this example, the standard word size can be 64 bits in the case of a 64-bit architecture. For a protected heap size of $2^M$ bytes. M can represent the number of bits needed for addressing bytes in the heap. Accordingly, N–M bits remain unused for addressing purposes. The N–M bits can be used for defining version numbers of objects as described within this specification.

A version n can represent the $n^{th}$ time a same object or storage space is allocated to hold a value. In an embodiment, an object or storage space can be defined according to the ISO/IEC 9899:1999 C standard, 1999; the ISO/IEC 14882: 1998 C++ standard, 1998; and the ISO/IEC 9899: 1999 C Technical Corrigendum, 2001. Storage space can be allocated just before the value is constructed and deallocated just after the value is destroyed. Since pointers to an object can survive after the object has been deallocated, the determination that a pointer points to the current object or an earlier version can be made using the version bits. The scheme allows $2^{N-M}$ distinct version numbers. Following that number of distinct version bits, version bits must be re-cycled after proving safe recyclability. Consider the case of a typical 64-bit word machine containing 64-bit pointers in which a protected heap of size 4 gigabytes (i.e., $2^{32}$ bytes) is desired. In that case, versions totaling $2^{64-32}=2^{32}=4G$ in number are supported, after which recycling needs to be performed.

FIG. 1 is a diagram illustrating basic declarations in accordance with an embodiment disclosed within this specification. More particularly, FIG. 1 includes C pseudo-code illustrating various declarations. For purposes of illustration, alignment considerations are ignored. Referring to FIG. 1, $H=2^{heap\_offset\_bits}$ is the protected heap size. The allocated layout for an object of type T is $L_{\_sizeof(T)}$, where $L_{\_k}$ is defined as shown in FIG. 1. The layout only involves the size of the type T and not the type itself. Thus, the various object lists specified in FIG. 1 can manage objects solely by size and allow storage sharing partitioned by size as opposed to type. For purposes of illustration, it can be assumed that no bitfield has a size of zero, which is a straightforward and special case.

Simple one-word pointers can be used to access the objects using the encoding for pointers, P, given in FIG. 1. For P encoding, a void * pointer is cast to a word P prior to being destructured. The simple one-word pointers are incapable of modeling intra-object pointers to members.

Referring again to FIG. 1, word is the machine word size (e.g. 32 bits, or 64 bits). CHAR_BIT is the number of bits in a byte, ordinarily eight. Encoded pointers can track addresses by the offset denoted as P.offset from the first location in the protected heap, which is referred to as protected_heap_first. The pointer into the protected heap for unused space can be another offset called unused_heap_offset. A marker_value is a random bitmask that can be used for backward compatibility purposes.

In an embodiment, an encoded pointer P can be defined as being one word long and comprising a version v bitfield and an offset bitfield. The metadata in an object $L_{\_k}$ can include two words both laid out or formatted like P. The first word, meta1, can store the version bitfield of the object and an offset to the next object in the linked list to which the object belongs, e.g., the allocated objects list, the free list etc. The second word meta2, can hold marker_value in the version bits for the purpose of backwards compatibility and an offset to the previous object in the linked list so the object management queues can be implemented as doubly-linked lists. In another embodiment, all offset fields that point to objects, in pointers, heads of lists below, or in objects themselves, can be configured to always point past the metadata in the pointed object, i.e., to the member o[] in L_k above. Accordingly, a non-empty list has a non-zero head field that allows zero to be reserved to indicate an empty list.

For each size k, there can be three global lists for managing objects. The three global lists can include a doubly-linked list of allocated objects that allows any object to be deallocated in constant time. The doubly-linked list also enables encoding of un-encoded pointers returned by un-protected code to provide support for backward compatibility. The three global lists further can include a free list denoted as free_list_k of previously freed objects that can be used at a next allocation and an unusable list denoted as unusable_free_list_k of previously freed objects that can no longer be reused because the objects have run out of fresh, usable version numbers and require version recycling.

Both the free list and unusable list can store objects with the version number advanced to a previously unused version. Thus, upon allocation, e.g., after recycling—for unusable_free_list_k when/if needed, this version number can be used directly. Because of this structure, if a dangling pointer test is carried out when a freed object is specified on one of these two lists, the test will work correctly since the dangling pointer is encoded with a previously used version while the freed object will have an unused one, The unusable free list is unusable, not because the unusable free list cannot be allocated from, but because an object allocated by the unusable free list cannot be freed later, e.g., without a preceding recycling.

Without recycling, versions would be allocated in increasing, round-robin order from 0 to no_of_versions−1, where the last version is reserved for residence on the unusable list. The upper limit of version allocations can also wrap around and move within the range [0 . . . no_of_versions−1]. The range limit separates freed version numbers from versions that may still be in use. This limit is tracked by last_version_k that moves round-robin in the range of version numbers. Last_version_k can be initialized to no_of_versions−2 since at the start, no recycling is involved, and no_of_versions−1 is reserved for the unusable list whose objects and object pointers are known to not be in use.

FIG. 2 is a diagram illustrating read and write related operations in accordance with another embodiment disclosed within this specification. Referring to FIG. 2, an encoded pointer can be translated to a standard C pointer by obtaining the offset field within the pointer and adding that offset field to protected_heap_first. Pointer decoding precedes each dereference of the object. Prior to decoding the pointer as described, a memory safety check requires that the version stored in the object be consistent with the version stored in the pointer. This memory safety check can be carried out by verify, wherein the right hand side of the equality test carries out the former and the left hand side carries out the latter.

The allocation procedure is statically customized to size k, e.g., prefix k allocate_protected_k. First an attempt to allocate from the free list is made. If that attempt fails, then an attempt to allocate from the unused heap is made. In this attempt, the version assigned is taken to be two past the (rotating) last_version_k limit. As mentioned earlier, one past the last_version_k is the number reserved for the unusable free list. If allocation does not succeed from either the free list or the unused heap, then an allocation failure is indicated by returning NULL. NULL is a constant, encoded pointer to a constant, never-deleted, zero-sized object (i.e., has no o[] field) allocated the protected heap at the beginning of program execution. While checking against NULL can be treated as a special case check to be added explicitly to the verify operation illustrated in FIG. 2, this check can be gracefully merged into usual spatial error checking to be described in greater detail within this specification. Returning NULL indicates allocation failure, FIG. 3 is a diagram illustrating allocation operations in accordance with another embodiment disclosed within this specification. Allocation effectively creates and populates an encoded pointer (ptr) with the pertinent offset and version v fields. Once an object to allocate is obtained, meta points to the start of the metadata affiliated with the object. The object metadata can be modified to reflect the doubly-linked structure of allocated_list_k. The previous offset field of any existing head object is set to the newly allocated object; the newly allocated object's previous is set to 0 reflecting the position of the object at the head; the head points to the newly allocated object; and the newly allocated object's next points to the previous head object.

FIG. 4 is a diagram illustrating deallocation operations in accordance with another embodiment disclosed within this specification. Deallocation also is customized to size k. Referring to FIG. 4, for purposes of illustration, it can be presumed that verify is executed beforehand to verify version and non-NULL legality. As used herein, "->" represents a member dereference operator in C, e.g., a postfix operator. In illustration, when "a" is a pointer to a structure (a struct or union), and "b" is a member of that structure, then "a->b" takes the pointer "a" and returns the member "b" of the structure which "a" points.

A successful deallocation increments, via increment_version_k, the version of the object that can be used both white specified on a free list or by the next allocation. In incrementing, if the last_version_k limit is crossed, then the object is placed on the unusable free list. Otherwise the object is placed on the standard free list. The crossing last_version_k can be decided by computing or determining a gap between the current version and the limit.

For example, consider the case in which last_version_k≥meta->v. In this case, the gap in FIG. 4 should be last_version_k meta->v, which is the case since the modulo arithmetic drops the no_of_versions addition. Consider also the case in which last_version_k <meta->v. In that case, the gap in FIG. 4 should be last_version_k (no_of_versions—meta->v), which again is the result provided by modulo arithmetic. FIG. 4 illustrates a technique for computing the correct gap in all cases as described.

Conservative garbage collection can be triggered under one or more different policies. Examples of these policies can include, but are not limited to, responsive to determining an out of space condition during object allocation, responsive to determining that memory has reached a threshold of occupancy, responsive to the system idling, responsive to determining that significant time, e.g., a predetermined amount of time, has transpired since the last garbage collection, responsive to determining that one or more managed object metrics indicate a potential for beneficial collection, etc.

Responsive to triggering conservative garbage collection, a filter for screening pointers from the data can be implemented. In an embodiment, the filter can be applied against all program data. The filter is constant-time. Further, the filter is defined in terms of protected memory meta-data by assuming that a pointer is an encoded pointer, decoding the pointer accordingly, and comparing the version of the pointer with the version stored in the expected object of the pointer. Only responsive to determining that the versions match is the assumed pointer believed to be an actual live pointer. This filter, or test, is a high-probability screen, though not a guaranteed screen. A guaranteed screen process is described in further detail within this specification.

The filter described above, e.g., the high-probability screen, does not perform a spatial test. Spatial testing is deliberately omitted to allow spatially diverse pointers to be screened as valid. Screening spatially diverse pointers as valid can increase flexibility since, for example, exceptional memory only disallows an out-of-bounds pointer to be de-referenced, not created or manipulated.

FIG. 5 is a flow chart illustrating a method 500 of conservative garbage collection in accordance with another embodiment disclosed within this specification. Method 500 can be implemented by a data processing system configured with program code to perform garbage collection as described.

Method 500 can begin in step 505, where initialization can be performed, Initializing can include initializing, or setting, the root set to null. All filtered encoded pointers found in the program's stack can be added to the root set. Further, filtered, encoded pointers in all registers and global variables minus the object management list headers, e.g., allocated_list_k, free_list_k, unusable free list k as described with reference to FIG. 1, can be added to the root set.

Beginning in step 510 and ending with step 520, the system can begin a marking phase. In step 510, the system can mark the referred objects of all just added root pointers. In step 515, the system can expand the root set with filtered encoded pointers that are contained in the marked objects. In step 520, the system can determine whether any changes to the root pointers have been made. When changes to the root pointers are detected, method 500 can loop back to step 510 to continue marking referred objects and expanding the root set, When no changes to the root pointers are made, method 500 can proceed to step 525.

In step 525, the system can perform verification. For example, the system can scan all non-live objects for any marked object on the non-live object and mark such objects red. Marking marked objects on non-live objects red can be performed since the filter described is not guaranteed. Since non-live objects are not necessarily found on the non-allocated object lists (e.g. a filter test that fortuitously points to matching memory that's not an encoded object), this step can be carried out during the mark phase above by collecting all the marked objects during the phase and subtracting objects on the allocated objects list from the final result.

In an embodiment, marking can be performed without utilizing a flag or other type of reserved bit. For example, object can be marked by connecting the objects within a list where the Objects are known to be marked objects, e.g., by pointing from one marked object to the next. Thus, marking of objects need not be literal, but rather implemented by collecting objects in a list as, or when, needed.

Beginning in step 530 and ending with step 540, the system can begin a re-marking phase. The re-marking phase can be similar to the marking phase described above. The re-marking phase, however, can exclude the addition of the red object pointers to the root set. Accordingly, in step 530, the system can mark referred objects of all just added root pointers excluding red object pointers. In step 535, the system can expand the root set with filtered encoded pointers that are contained in the marked objects. In step 540, the system can determine whether any changes to the root pointers have been made. When changes to the root pointers are detected, method 500 can loop back to step 530 to continue the re-marking process. When no changes to the root pointers are made, method 500 can proceed to step 545. The re-marking process ensures that all the marked objects are guaranteed, as are the found putative pointers.

In step 540, the system can implement a sweep process. The system can sweep all objects on the allocated list that are not marked in the re-marking phase as such objects are determined to be or include memory-teak objects. Thus, in an example, each object of the root set not marked can be designated as including, or being, a memory leak. In an embodiment, each allocated object can identify the command that created the object in order to communicate the result outside of the system.

For purposes of analysis, non-live encoded pointers also are collected. To collect non-live encoded pointers, the re-marking phase can be performed with more than one set of filters, e.g., two sets of filters. A first filter can be defined as previously described where a match between the object version and the pointer version is determined when comparing a properly formatted, putative pointer/object pair. A second filter can match the encoding format in making a decision by, for example, analyzing the marker fields in the object. The putative pointers matching encoding format only form a superset of the version-matched pointers and are collected separately. At the end of garbage collection, the version-matched pointers are subtracted from the format matched pointers. The result from the subtraction can be screened for only those pointers having version-mismatched objects that are found among allocated_list_k, unusable free_list_k, and free_list_k objects.

In accordance with the one or more embodiments disclosed within this specification, and as illustrated above, putative pointers that fail the filter test can be logged for user inspection. For example, putative pointers can be logged by ignoring unencoded putative pointers as non-pointer values with only overall statistics being maintained for the unencoded putative pointers. Further, mis-encoded putative pointers, i.e., non-live object pointers, can be stored along with information about the object containing the, or each, mis-encoded putative pointer.

As discussed, C and C-type languages allow pointer synthesis. Conventional garbage collection techniques overlook this feature of in assuming that when garbage collection occurs, the only pointers to be dealt with are the pointers found in program memory. This assumption renders conventional techniques unable to detect additional pointers that the program may generate through computation, e.g., such as through pointer arithmetic. The effects of these computed pointers, as opposed to in-memory pointers, on garbage collection conclusions are ignored.

By comparison, the one or more embodiments disclosed within this specification account for effects of pointer synthesis through arithmetic, which are contained and captured at the time of garbage collection. The effects of pointer synthesis are accounted for because the one or more embodiments disclosed herein are agnostic of the spatial offset of a pointer within/without the referent object of the pointer. For pointers synthesized from integers (pointer cast), a simple requirement that the generated pointer be live and inbound to a referent object can be used to ensure that the objects in allocated_list_k capture all the effects of such pointer generation by the explicit addition of pointers to objects in allocated_list_k to the root set in the garbage collection processing described with reference to FIG. 5 during the initialization step 505. If garbage collection is known to be insulated from a succeeding pointer cast (integer to pointer), e.g., by the absence of such casts in the program, then this step need not be performed and meaningful results of an analysis such as memory leak detection can be determined. The requirement that a pointer cast yield a live and inbound pointer is straight-forward to implement as a part of the cast by encoding the pointer using allocated_list_k objects, e.g., by finding the object in which the pointer is inbound, It should be appreciated that the addition of allocated_list_k pointers to the root set can yield useful garbage collection results from a recycling versions perspective to be described herein in further detail. Since integer to pointer casts explicitly check for a generated pointer being inbound, the one or more embodiments disclosed herein also allow the more aggressive position of allocated_list_k pointers not being added to the root set. This more aggressive position leaves the live inbound check at the cast time to ensure that a synthesis of such an object pointer later is meaningful from the later actual time perspective that the generated pointer then has to be reflected in the allocated_list_k objects of that time, thereby freeing the garbage collection process to do whatever optimizations relating to fixing memory leaks are deemed fit at its time.

In another embodiment, the two options of adding allocate_list_k pointers to the root set or not can be made available to a user through a compiler flag setting. The semantics of a pointer cast with the two compiler flag settings can be, for example, that an integer cast to a pointer is valid only if the resulting pointer is live and in-bound to a currently allocated object, wherein the set of currently allocated objects is guaranteed to include each allocated object with a live program reference/pointer to that object.

The one or more embodiments disclosed herein provide for more efficient garbage collection through the metadata and structure of the exceptional memory, e.g., the memory architecture(s) and/or the various techniques relating to the thereof within this specification. Further, the results provided are more meaningful and accurate since pointer synthesis is taken into account.

Determining when a pointer cast (to-from other scalars) occurs is hardened by implicit casts specifiable within C and by the existence of multiply typed views (pointers) of the same object. In an embodiment, the determination of when a pointer cast occurs can be performed by maintaining with each object the current type of the object. As the program switches from a pointer to pointer (i.e., from one typed view to another typed view), or casts a pointer to another type, the current type of the object can be changed minimally, by a set of sub-object casts, accordingly. Similarly, type changes through unions can be treated. Upon casting to an incomplete type, e.g. void *, all contained pointers within an object can be translated to their decoded values so that later usual manipulation as ordinary integers can be carried out. When non pointer scalars get cast to pointer values, the usual encoding as live, inbound object pointers can be enforced. These casts may throw an exception, such as when a non-live or non-inbound pointer is cast to an integer, which can be disallowed as a compiler option. With a single threaded typed view of each object attained, meta-data of encoded pointers is not accessible to the program for user manipulation. This access denial can hold true for object metadata also within exceptional memory itself. When linked to legacy code (e.g. backward compatibility interface to legacy code), the non-access to object metadata of the legacy code has to be certified separately.

In another embodiment, the need to chase putative pointers inside non-live memory can be eliminated. With regard to conventional conservative garbage collection techniques, this type of assertion does not hold since such pointer chasing through "objects" beyond allocated objects means that the entire readable machine memory needs to be scanned (any unqualified optimizations to the contrary are unsafe and wrong). Furthermore, such a laborious scan still does not yield a handle on program synthesizable pointers that are ignored by conventional garbage collection techniques as previously described.

In general, a pointer arithmetic operation can yield a pointer with metadata corresponding to an object on the managed lists (allocated list, free list, unusable free list). Consider the case of a first pointer arithmetic operation over a pointer. Regardless of all aliasing operations (e.g., assignments, initialization), this pointer has only been created as a managed object pointer using the address of operator in this case. Since the pointer is extant, no intervening garbage collection has removed the object associated with the pointer from the managed lists. Hence, the first pointer arithmetic operation yields a pointer associated with the same managed object as the initialized pointer.

The pointer resulting from the application of a sequence of k pointer arithmetic operations in the course of program execution yields a managed object pointer. In the k+1th case, based upon the foregoing, the pointer after k pointer arithmetic operations is a managed object pointer. Since the pointer is extant at the k th operation, no intervening garbage collection has removed the object associated with the pointer from the managed lists. Hence the k+1th pointer arithmetic operation yields a pointer associated with the same managed object as the pointer after the kth pointer arithmetic operation.

It follows that an exceptional memory program, e.g., a program utilizing the one or more embodiments disclosed within this specification, cannot generate a pointer with metadata corresponding to an object not on the managed lists. Pointer synthesis can occur only in the context of an existing pointer, or by an integer-to-pointer cast. In the case of cast, the metadata is tied to the allocated object that the cast finds the integer to be inbound to. As discussed, for the existing pointer case, the object to which the existing pointer is tied is on the managed lists. As such, any pointer synthesis operation yields a pointer that has metadata corresponding to managed objects exclusively.

Thus, the memory represented by a validly-encoded-pointer-alike datum does not need to be scanned by garbage collection to collect pointers in the context of the one or more embodiments disclosed herein. Consider the following two cases.

In the first case, the datum is a pointer in the program. This is not possible since the datum represents a pointer with metadata not corresponding to any managed object in the system and such pointers are not possible in a program.

In the second case, the datum is not a pointer in the program. In the second case, the memory represented by the datum is not going to be dereferenced unless the datum is cast to a pointer. In case of a pointer cast, the validity check that the datum point to a currently allocated object ensures that either the cast will fail, or the metadata will be changed to correspond to a currently allocated object. In these cases, the memory represented by the datum as a validly-encoded-pointer literally is not going to be dereferenced.

Since the memory represented by the datum is never dereferenced, it does not need to be scanned as disclosed herein.

That the memory represented by a validly-encoded-pointer-alike datum does not need to be scanned by garbage collection to collect pointers is implicit in the one or more embodiments disclosed within this specification. Consider the following C code fragment:

$T^*p = (T^*)\text{random}();$ $z = p\text{->}f;$ random() in the above fragment returns a random integer address to some readable part of the machine memory (not necessarily malloc'ed object). The above C program will dereference the randomly located T-typed object and use the T-typed object in computing z. Due to the possibility of such code, conventional garbage collection must chase pointers through the entire machine readable memory and not just malloc'ed objects. By comparison, in accordance with the one or more embodiments disclosed herein, this would be disallowed by the live/inbound restriction on the random cast.

It should be appreciated that in the above example the type T, and hence the related object bounds, are not known to a garbage collector and hence have to be guessed, forcing general traversal of the machine memory. Further since random can return a pointer to any malloc'ed object, the usual memory leak analysis of conventional garbage collection techniques that concludes that some objects are unreachable is compromised, while this is not the case with regard to the one or more embodiments disclosed herein.

In further illustration, for example, behaviors such as obtaining a pointer to an unreachable malloc'ed object by estimating the stride between malloc'ed objects or using pointer arithmetic to compute a pointer using other object pointers can compromise leak analysis of conventional garbage collection techniques.

Further information relating to heap management can be found in U.S. Patent Publication No. 2009/0271763, the contents of which are fully incorporated within this specification in their entirety.

Synthesizing un-tracked pointers, in accordance with the one or more embodiments disclosed herein, can include casting a pointer to integer, doing integer arithmetic on the same (not pointer arithmetic), and then casting back to a different object pointer thereafter. Although such a technique appears as a way of defeating the conservativeness of the one or more embodiments disclosed herein, such is not the case. The cast back requires that the referent object of the target pointer be alive at the time of the cast, which is guaranteed only if a live pointer to that object is already extant. Keeping a live pointer to an object around so that another live pointer to the object can be synthesized via the integer domain defeats the purpose of such pointer synthesis. The one or more embodiments disclosed herein provide conservative garbage collection by, at least in part, tracking encoded pointers exclusively, not tracking integers/integer arithmetic, and choosing a careful cast interface between the two.

Figure 6:
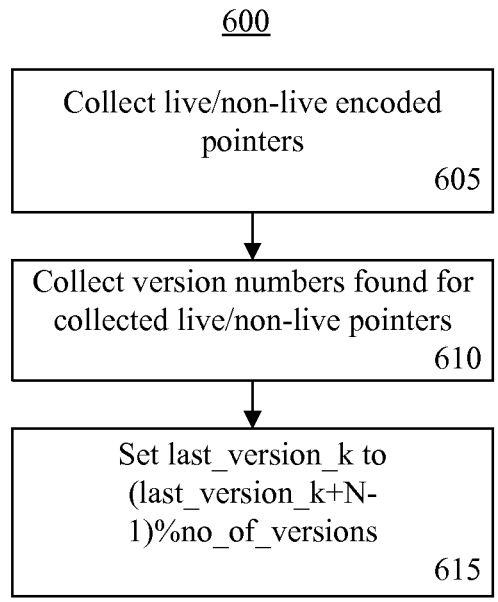
FIG. 6 is a flow chart illustrating a method of recycling management in accordance with another embodiment disclosed within this specification.

FIG. 6 is a flow chart illustrating a method 600 of recycling management in accordance with another embodiment disclosed within this specification. More particularly, FIG. 6 provides a method 600 for recycling versions. Method 600 can be implemented in the context, e.g., during, the garbage collection process described above with reference to FIG. 5, for example.

In step 605, the system can collect or determine the live/non-live encoded pointers found, e.g., all live/non-live pointers found. In step 610, the system can collect or determine the version numbers found for the live/non-live pointers determined in step 605. The collected information can be used in recycling versions that are no longer in use. For example, consider the case where an N is selected in which $2 \leq n \leq N \leq no\_of\_versions$, where each version=(last_version_k+n)% no_of_versions is not in use. Within this specification, the "%" symbol is used as "mod" representing a modulus operation. It should be appreciated that (last_version_k+1)% no_of_versions is never in use, being reserved for the unusable_free_list_k objects. Any such version found must be treated as the consequence of a non-pointer value equaling and getting viewed as this version's encoded pointer. Accordingly, last_version_k can be advanced round robin through these unused/out-of-use versions to enable recycling of objects, In step 615, the system can set last_version_k to (last_version_k+N−1)% no_of_versions. The process reserves reserving one version for use by the unusable free list k after step 615. The advance of last_version_k can be carried out in a step post garbage collection, e.g., after step 540, wherein after advancing last_version_k as described, unusable_free_list_k objects are shifted to free_list_k to allow continued allocation of these blocked objects. Periodically, with the support of garbage collection, last_version_k can be advanced as described above, recycling out-of-use versions in the process.

Consider the case in which the system determines that no such out-of-use versions can be recycled (i.e., there is no N found). In that case out-of-use versions from elsewhere in the version space still can be recycled. For example, Suppose it is found that for some N and M, $2 \leq N < m \leq M \leq no\_of\_versions$, where $N+1 < M$ and each version=(last_version_k+m)% no_of_versions is not in use. In this example, versions up to N are occupied. A portion of versions ranging from N+1 to M is not occupied. Further, the range from N+1 to M includes at least two out-of-use versions. The pointers in the range up to N can be called stragglers since the pointers represent long-lived pointers that are blocking normal recycling. Regardless, last_version_k can still be advanced past stragglers that point to live objects, to (last_version_k+M−1)% no_of_versions as described in further detail below.

Each of the live pointers occupying the versions up to N can be viewed as having undergone no_of_versions free() and allocation requests in isolation, thereby initializing the live pointers with the same data as a part of the garbage collection process. Accordingly, as last_version_k is advanced by M−1, these stragglers have advanced by no_of_versions to come close to the new last_version_k. For purposes of illustration, it can be assumed that there are non-live straggler pointers to some object Hocking recycling and that this object is currently not on the allocated list of objects. In that case, the non-live stragglers pointing to this object can be viewed as replaced with no_of_versions version-advanced pointers, so long as the affiliated object that is residing on the free_list_k or unusable_free_list_k is modified to contain a version more advanced than all the version-advanced straggler versions pointing to it. Thus, (last_version_k+N+1)% no_of_versions is an example of such a version. Another example of such a version is one past the most advanced version among the non-live stragglers pointing to this object. Finally, last_version_k can now be advanced past stragglers to (last_version_k+M−1)% no_of_versions. In both the straggler cases (live/non-live), after advancing last_version_k thus, unusable_free_list_k objects are shifted to free_list_k to allow continued allocation of these blocked objects, The straggler processing described above illustrates how recycling can continue to make progress so long as a stretch or range of two out-of-use versions can be found in the version space beyond last_version_k and non-live stragglers if any point to a non-allocated object only.

Figure 7:
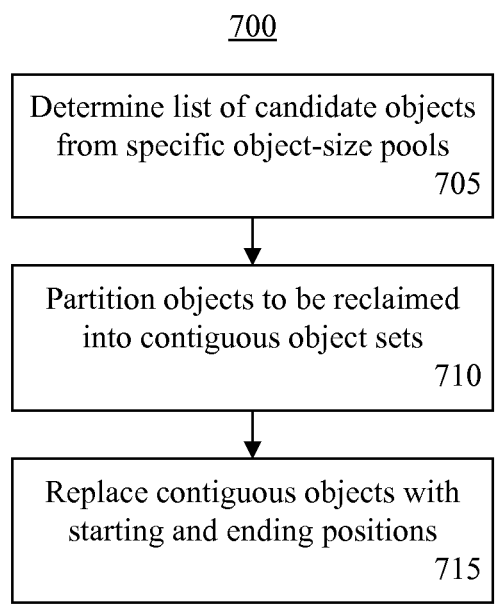
FIG. 7 is a flow chart illustrating a method of object reclamation in accordance with another embodiment disclosed within this specification.

FIG. 7 is a flow chart illustrating a method 700 of object reclamation in accordance with another embodiment disclosed within this specification. Method 700 can be implemented for general space re-allocation and provides allocation/deallocation procedure(s).

In general, an object without encoded (live/non-live) pointers to that object can be re-claimed post garbage collection for re-use as a differently encoded object (different meta-data). Any of a variety of different policies for re-claiming objects can be utilized. Examples of policies can include, but are not limited to, when an allocation cannot be carried out due to no recyclable object availability and free space exhaustion; using a pro-active threshold before the preceding condition; a user/compiler call for object reclamation, etc.

Responsive to a decision or determination to reclaim objects, in step 705, the system can determine a list of candidate objects from specific object-size pools. Step 705 can be performed during a post garbage collection sweep. The policies used in making the list include preference for contiguity of objects, re-use likeliness in a given size list, etc.

In step 710, the system can partition the objects to be reclaimed into contiguous object sets. In step 715, the system can replace the contiguous objects with the starting and ending positions of the contiguous memory represented by the objects. Thus, contiguous object sets get translated into memory gaps to be reclaimed. Besides object management, the system further provides have free-space (gap) management.

In step 720, the system can maintain gaps in a sorted-by-size arrangement. Consider the case in which there are n object sizes maintained in the object system, e.g., the various k-sized object lists such as allocated_list_k. The sizes can be represented as $s_1, s_2, s_3, \ldots s_n$, in increasing order. Gaps can be maintained in n lists for gap sizes $[s_1 \ldots s_2), [s_2 \ldots s_3), [s_3 \ldots s_4), \ldots, [s_n \ldots )$. The headers of the n gap lists can be maintained as a linked list, with a gap list being created or deleted upon the availability of gaps. There can be n additional headers for the n gap lists.

Each header can point to a corresponding gap list header in the linked list for direct access of that header. Responsive to determining that such a header is not available due to non-availability of gaps of the pertinent size, the next available, larger-size header can be pointed to. An allocation request an object of size $s_i$ causes the gap list for sizes $[s_i \ldots s_{i+1})$ to be looked up, which, if unavailable, yields the next available larger gaps list as the looked up result. Responsive to determining that none is available, then allocation fails due to unavailable memory. In this arrangement, lookup takes constant time, while gap insertion and deletion can take time linear in n, which in practical cases of fixed set of allocation sizes can be a small constant. Allocation can move un-used gaps around including dropping them in a small gaps list, of sizes less than $s_1$. The small gaps list is considered for gap increase each time garbage collection is carried out and gaps are created.

Figure 8:
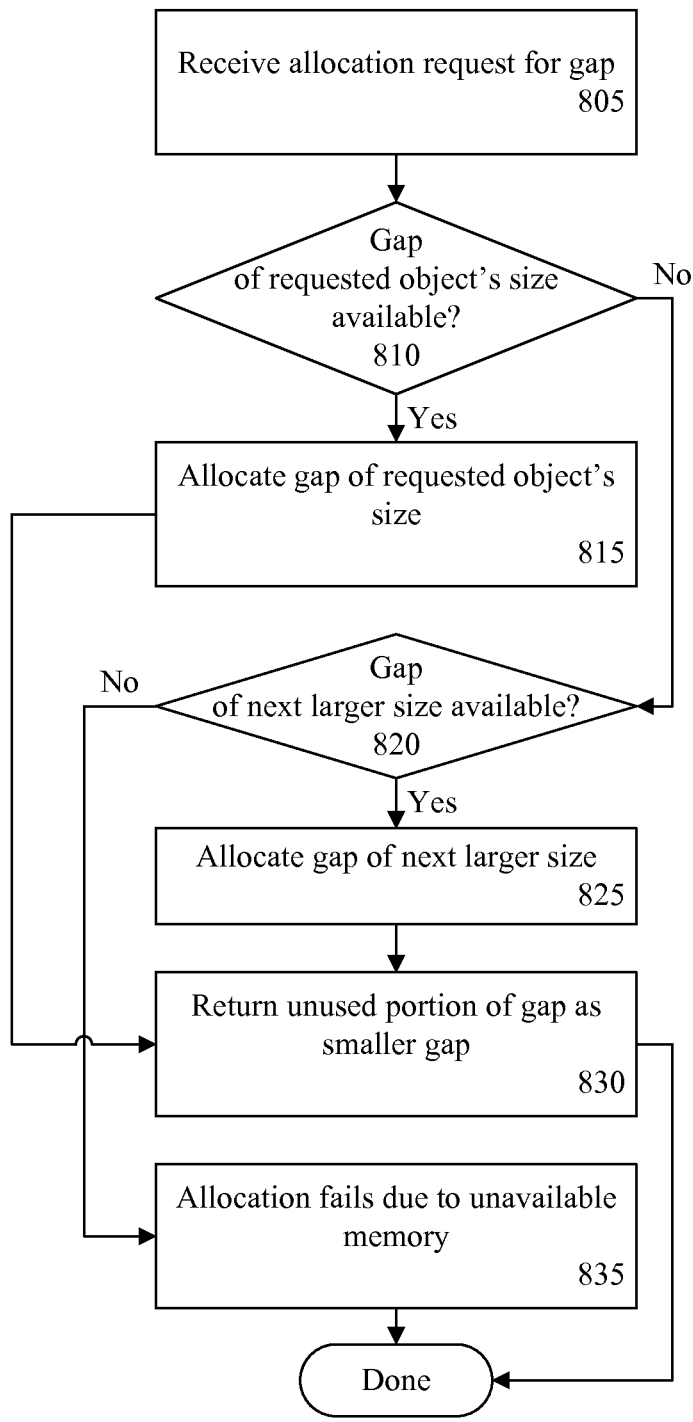
FIG. 8 is a flow chart illustrating a method of allocating memory in accordance with another embodiment disclosed within this specification.

FIG. 8 is a flow chart illustrating a method 800 of allocating memory, e.g., gaps, in accordance with another embodiment disclosed within this specification, Method 800 can begin in step 805, where a request for allocation of a gap can be received. In step 810, the system can determine whether a gap of the requested object's size is available. Responsive to determining that no gap of the requested object's size is available, method 800 can continue to step 820. Responsive to determining that a gap of the requested object's size is available, method 800 can proceed to step 815 to allocate the gap of the requested object's size to the requestor. After step 815, method 800 can continue to step 830.

Continuing with step 820, the system can determine whether a gap of a next larger size is available. Responsive to determining that a gap of the next larger size is available, method 800 can continue to step 825 where the system can allocate the gap of the next larger size to the requestor. In step 830, since a variety of gap sizes can be allocated for a given object size, the system can return the unused portion of the gap allocated in step 825 back to the system, e.g., to the gap management system or subsystem as the case may be, as a smaller gap. The return of the unused portion as a smaller gap can include return the portion to the small gaps list described above. Responsive to determining that a gap of the next larger size is not available, method 800 can continue to step 835 where the allocation fails due to unavailable memory. In one aspect, the requestor can be provided with a response or other indication that no memory is available to fulfill the request.

Figure 9:
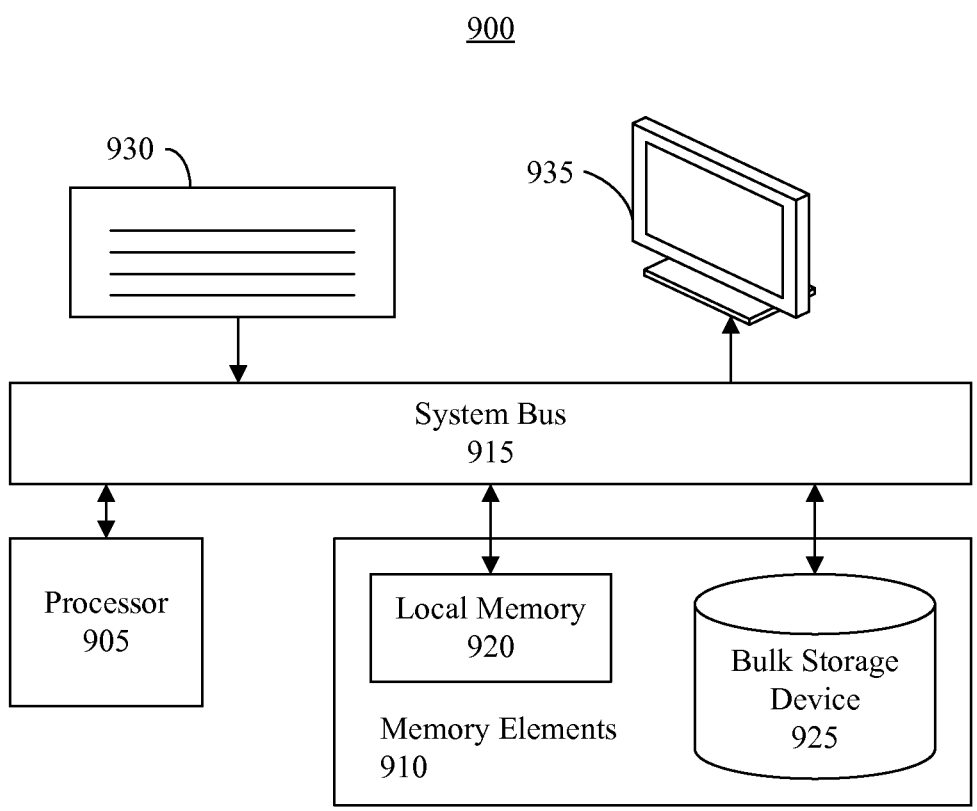
FIG. 9 is a block diagram illustrating an example of a data processing system.

FIG. 9 is a block diagram illustrating an example of a data processing system 900. Data processing system (system) 900 can be configured to perform the various operations, functions, and/or steps disclosed within this specification. For example, system 900 can be configured to perform garbage collection and memory access protection in accordance with another embodiment disclosed within this specification.

System 900 can include at least one processor 905 coupled to memory elements 910 through a system bus 915. As such, system 900 can store program code within memory elements 910. Processor 905 can execute the program code accessed from memory elements 910 via system bus 915. Accordingly, responsive to executing program code, processor 905 and system 900 can be configured to perform the various functions and steps disclosed within this specification, e.g., garbage collection, memory access protection, object reclamation, object allocation/deallocation, recycling management, and the like.

In one aspect, for example, system 900 can be implemented as computer that is suitable for storing and/or executing program code. In another aspect, for example, system 900 can be implemented as a mobile computing device that is suitable for storing and/or executing program code. It should be appreciated that system 900 can be implemented in the form of any system comprising a processor and memory that is capable of performing the functions described within this specification.

Memory elements 910 can include one or more physical memory devices such as, for example, local memory 920 and one or more bulk storage devices 925, Local memory 920 refers to random access memory or other non-persistent memory device(s) generally used during actual execution of the program code. Bulk storage device(s) 925 can be implemented as a hard drive or other persistent data storage device. System 900 also can include one or more cache memories (not shown) that provide temporary storage of at least some program code in order to reduce the number of times program code must be retrieved from bulk storage device 925 during execution.

Input/output (I/O) devices such as a keyboard 930, a display 935, and a. pointing device (not shown) optionally can be coupled to system 900. The I/O devices can be coupled to system 900 either directly or through intervening I/O controllers. Network adapters also can be coupled to system 900 to enable system 900 to become coupled to other systems, computer systems, remote printers, and/or remote storage devices through intervening private or public networks. Modems, cable modems, and Ethernet cards are examples of different types of network adapters that can be used with system 900.

The flowcharts and block diagrams in the Figures illustrate the architecture, functionality, and operation of possible implementations of systems, methods and computer program products according to various embodiments of the present invention. In this regard, each block in the flowchart, or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based. systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of memory management comprising:
creating an initial root set of pointers for a program during execution of the program;
performing a marking process by iteratively marking referred objects of each pointer of the root set and expanding the root set with filtered, encoded pointers;
identifying each non-live object for any marked object as red-marked;
performing, using a processor, a re-marking process on the root set in which red-marked objects are excluded; and
designating each object of the root set not marked as comprising a memory leak.

2. The method of claim 1, further comprising:
performing the marking process until no changes are made to the root set.

3. The method of claim 1, wherein identifying each non-live object for any marked object as red-marked further comprises:
identifying objects marked during the marking process; and
subtracting objects specified on an allocated objects list from the objects that are marked.

4. The method of claim 1, further comprising:
requiring each pointer generated by the program be live and inbound to a referent object.

5. The method of claim 1, wherein performing a re-marking process on the root set in which red-marked objects are excluded further comprises:
filtering pointer and object pairs according to a version number included within each pointer and a version number included within each object.

6. The method of claim 5, further comprising:
recycling version numbers determined to be out of use.

7. The method of claim 1, further comprising:
partitioning objects identified on a list of candidate objects into contiguous object sets, wherein each candidate object is not specified by a pointer;
replacing each set of contiguous objects sets with a starting position and an ending position; and
reclaiming each set of contiguous objects as a memory gap that is available as specified by the starting position and the ending position.

8. A system comprising:
a computer readable storage medium having computer readable program code embodied therewith;
a processor coupled to the computer readable storage medium, wherein responsive to executing the computer readable program code, the processor is configured to perform executable operations for memory management comprising:
creating an initial root set of pointers for a program during execution of the program;
performing a marking process by iteratively marking referred objects of each pointer of the root sot and expanding the root set with filtered, encoded pointers;
identifying each non-live object for any marked object as red-marked;
performing a re-marking process on the root set in which red-marked objects are excluded; and
designating each object of the root set not marked as comprising a memory leak.

9. The system of claim 8, wherein the processor is further configured to execute an operation comprising:
performing the marking process until no changes are made to the root set.

10. The system of claim 8, wherein identifying each non-live object for any marked object as red-marked further comprises:
identifying objects marked during the marking process; and
subtracting objects specified on an allocated objects list from the objects that are marked.

11. The system of claim 8, wherein the processor is further configured to execute an operation comprising:
requiring each pointer generated by the program be live and inbound to a referent object.

12. The system of claim 8, wherein performing a re-marking process on the root set in which red-marked objects are excluded further comprises:
filtering pointer and object pairs according to a version number included within each pointer and a version number included within each object.

13. The system of claim 12, wherein the processor is further configured to execute an operation comprising:
recycling version numbers determined to be out of use.

14. The system of claim 8, wherein the processor is further configured to execute operations comprising:
partitioning objects identified on a list of candidate objects into contiguous object sets, wherein each candidate object is not specified by a pointer;
replacing each set of contiguous objects sets with a starting position and an ending position; and
reclaiming each set of contiguous objects as a memory gap that is available as specified by the starting position and the ending position.

15. A computer program product for memory management, the computer program product comprising:

a computer readable storage medium having computer readable program code embodied therewith, the computer readable program code comprising:

computer readable program code configured to create an initial root set of pointers for a program during execution of the program;

computer readable program code configured to perform a marking process by iteratively marking referred objects of each pointer of the root set and expanding the root set with filtered, encoded pointers;

computer readable program code configured to identify each non-live object for any marked object as red-marked;

computer readable program code configured to perform a re-marking process on the root set in which red-marked objects are excluded; and computer readable program code configured to designate each object of the root set not marked as comprising a memory leak, wherein the computer readable storage medium does not consist of a transitory, propagating signal.

16. The computer program product of claim 15, wherein the computer readable program code configured to identify each non-live object for any marked object as red-marked further comprises:

computer readable program code configured to identify objects marked during the marking process; and computer readable program code configured to subtract objects specified on an allocated objects list from the objects that are marked.

17. The computer program product of claim 15, wherein the computer readable program code further comprises:

computer readable program code configured to require each pointer generated by the program be live and inbound to a referent object.

18. The computer program product of claim 15, wherein the computer readable program code configured to perform a re-marking process on the root set in which red-marked objects are excluded further comprises:

computer readable program code configured to filter pointer and object pairs according to a version number included within each pointer and aversion number included within each object.

19. The computer program product of claim 18, wherein the computer readable program code further comprises:

computer readable program code configured to recycle version numbers determined to be out of use.

20. The computer program product of claim 15, wherein the computer readable program code further comprises:

computer readable program code configured to partition objects identified on a list of candidate objects into contiguous object sets, wherein each candidate object is not specified by a pointer;

computer readable program code configured to replace each set of contiguous objects sets with a starting position and an ending position; and computer readable program code configured to reclaim each set of contiguous objects as a memory gap that is available as specified by the starting position and the ending position.

* * * * *